(12) United States Patent
Nishio et al.

(10) Patent No.: US 12,273,929 B2
(45) Date of Patent: Apr. 8, 2025

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 330 days.

(21) Appl. No.: 17/442,928

(22) PCT Filed: Mar. 24, 2020

(86) PCT No.: PCT/JP2020/013055
§ 371 (c)(1),
(2) Date: Sep. 24, 2021

(87) PCT Pub. No.: WO2020/196534
PCT Pub. Date: Oct. 1, 2020

(65) Prior Publication Data
US 2022/0191946 A1    Jun. 16, 2022

(30) Foreign Application Priority Data
Mar. 28, 2019 (JP) ................................ 2019-064589

(51) Int. Cl.
*H04W 56/00* (2009.01)
*H04W 72/0446* (2023.01)
(Continued)

(52) U.S. Cl.
CPC ... *H04W 74/0841* (2013.01); *H04W 56/0045* (2013.01); *H04W 72/0446* (2013.01);
(Continued)

(58) Field of Classification Search
CPC ....... H04L 5/0001–0098; H04L 27/0002–389; H04W 8/18–245; H04W 24/02–10;
(Continued)

(56) References Cited

U.S. PATENT DOCUMENTS 9,820,244 B2   11/2017  Earnshaw et al.
2011/0222527 A1*  9/2011  Hole ................. H04W 74/0833
(Continued)

FOREIGN PATENT DOCUMENTS

| JP | 2013/516917 A | 5/2013 |
| WO | 2018/223393 A1 | 12/2018 |
| WO | 2021/155845 A1 | 8/2021 |

OTHER PUBLICATIONS

Extended European Search Report, dated Apr. 21, 2022, for European Application No. 20779593.1-1203. (7 pages).
(Continued)

*Primary Examiner* — Timothy J Weidner
(74) *Attorney, Agent, or Firm* — Seed IP Law Group LLP

(57) ABSTRACT

The purpose of the invention is to realize appropriate random-access procedures in accordance with propagation delay between a terminal and a base station. A terminal (100) comprises a wireless transmission unit (104) that transmits signals of a random-access channel, and a control unit (108) that controls resource settings regarding transmission of signals on the random-access channel on the basis of effectiveness of information relating to adjustment of transmission timing.

12 Claims, 9 Drawing Sheets

(51) Int. Cl.
| | |
|---|---|
| *H04W 74/00* | (2009.01) |
| *H04W 74/08* | (2024.01) |
| *H04W 74/0833* | (2024.01) |
| *H04W 74/0836* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ..... *H04W 74/002* (2013.01); *H04W 74/0833* (2013.01); *H04W 74/0836* (2024.01); *H04W 74/0866* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 28/02–26; H04W 36/0005–385; H04W 48/02–20; H04W 56/0005–0095; H04W 72/02–569; H04W 74/002–0891; H04W 84/005–22; H04W 88/005–188; H04W 92/02–24
See application file for complete search history.

(56) References Cited

U.S. PATENT DOCUMENTS

| | | | |
|---|---|---|---|
| 2012/0008600 A1 | 1/2012 | Marinier et al. | |
| 2014/0044108 A1* | 2/2014 | Earnshaw | H04W 56/0045 |
| 2020/0252967 A1* | 8/2020 | Ozturk | H04W 74/0833 |
| 2021/0168869 A1* | 6/2021 | Gupta | H04W 56/0045 |

OTHER PUBLICATIONS

3GPP TR 38.811 V15.0.0, "3$^{rd}$ Generation Partnership Project; Technical Specification Group Radio Access Network; Study on New Radio (NR) to support non terrestrial networks (Release 15)," Jun. 2018, 119 pages.

3GPP TS 38.300 V15.8.0, "3$^{rd}$ Generation Partnership Project; Technical Specification Group Radio Access Network; NR; NR and NG-RAN Overall Description; Stage 2 (Release 15)," Dec. 2019, 99 pages.

3GPP TS 38.321 V15.4.0, "3$^{rd}$ Generation Partnership Project; Technical Specification Group Radio Access Network; NR; Medium Access Control (MAC) protocol specification (Release 15)," Dec. 2018, 77 pages.

International Search Report, dated Jun. 30, 2020, for International Application No. PCT/JP2020/013055, 4 pages. (with English translation).

* cited by examiner

100

200

TRANSMISSION DEVICE, RECEPTION DEVICE, TRANSMISSION METHOD, AND RECEPTION METHOD

TECHNICAL FIELD

The present disclosure relates to a transmission apparatus, a reception apparatus, a transmission method, and a reception method.

BACKGROUND ART

In the standardization of 5G, New Radio access technology (NR) was discussed in 3GPP and the Release 15 (Rel. 15) specification for NR was published.

In radio communication systems such as NR, a random access procedure using a random access channel is performed for connection between a terminal (also called a User Equipment (UE)) and a base station (also called a gNodeB (gNB)).

CITATION LIST

Non-Patent Literature

NPL 1
3GPP, TR38.811 "Study on New Radio (NR) to support non terrestrial networks"
NPL 2
3GPP TS38.321, "Medium Access Control (MAC) protocol specification"

SUMMARY OF INVENTION

However, there is scope for further study on an appropriate random access procedure depending on a propagation delay of propagation between a terminal and a base station.

One non-limiting and exemplary embodiment of the present disclosure facilitates providing a transmission apparatus, a reception apparatus, a transmission method, and a reception method capable of realizing the appropriate random access procedure corresponding to a propagation delay of propagation between the terminal and the base station.

A transmission apparatus according to an exemplary embodiment of the present disclosure includes: transmission circuitry, which, in operation, transmits a signal of a random access channel; and control circuitry, which, in operation, controls a resource configuration relevant to transmission of the signal in the random access channel based on a validity property of information on adjustment of a transmission timing.

A reception apparatus according to an embodiment of the present disclosure includes: reception circuitry, which, in operation, receives a signal of a random access channel; and control circuitry, which, in operation, controls reception of the signal based on a resource configuration relevant to transmission of the signal in the random access channel, the resource configuration being associated with a validity property of information on adjustment of a transmission timing.

A transmission method according to an exemplary embodiment of the present disclosure includes: controlling a resource configuration relevant to transmission of a signal in a random access channel based on a validity property of information on adjustment of a transmission timing; and transmitting the signal of the random access channel.

A reception method according to an exemplary embodiment of the present disclosure includes: controlling reception of a signal based on a resource configuration relevant to transmission of the signal in a random access channel, the resource configuration being associated with a validity property of information on adjustment of a transmission timing; and receiving the signal of the random access channel.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to realize an appropriate random access procedure corresponding to a propagation delay of propagation between a terminal and a base station.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

[Random Access Procedure]

For example, a random access procedure is performed by 4-step random access (also referred to as "4-step Random Access Channel (RACH) or "4-Step Contention Based Random Access (CBRA)).

Figure 1:
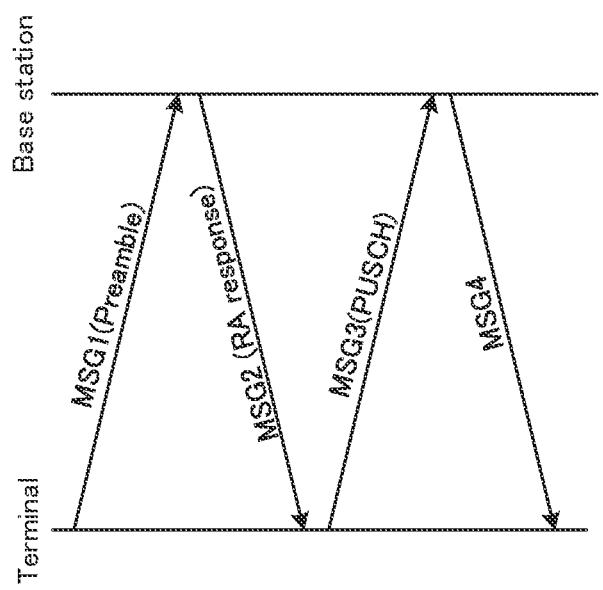
FIG. 1 illustrates an example of a 4-step random access procedure.

FIG. 1 illustrates an example of the 4-step random access procedure. In the 4-step random access, for example, as illustrated in FIG. 1, a terminal (UTE) transmits a Preamble signal of a Physical Random Access Channel (PRAM) to a base station (gNB) in transmission (MSG1) at the first step. The MSG1 transmission by the terminal is performed at a transmission timing (slot timing) notified per cell by the base station.

The base station receives and decodes MSG1, and, in transmission (MSG2) at the second step, notifies the terminal of a response (RA response) to the Preamble signal, scheduling information including an uplink transmission timing of MSG3, and the like.

The terminal receives and decodes MSG2, and, in transmission (MSG3) at the third step, notifies the base station of information for Connection establishment such as information on the terminal (e.g., terminal ID or the like) using the scheduling information indicated by MSG2. MSG3 is notified, for example, in a Physical Uplink Shared. Channel (PUSCH). The information notified by MSG3 may be referred to as Radio Resource Control (RRC) connection request information.

The base station receives and decodes MSG3 and notifies a Connection establishment response or the like in transmission (MSG4) at the fourth step.

[PRACH]

For example, the PRACH (e.g., MSG1 in FIG. 1) used in NR is composed of a cyclic prefix (CP), Preamble sequence (Preamble part), and guard period (GP). The Preamble sequence is generated, for example, from code sequences (e.g., Cyclic shifted Zadoff-Chu (CS-ZC) sequences) or the like having preferable correlation characteristics. The CP is a signal obtained by copying a part of the Preamble sequence. The GP is a no-transmission section. Note that, the code sequences used for the Preamble sequence are not limited to the CS-ZC sequences, and may be any code sequences having preferable correlation characteristics. Note that a signal including the CP, Preamble sequence, and GP, and transmitted in the PRACH may be referred to as "Preamble signal." The transmission of the Preamble signal and the like in the PRACH may be described as "PRACH transmission."

These pieces of information on the PRACH are included in system information transmitted per cell of the base station, for example, and notified to the terminal. For example, CS-ZC sequences different between Preamble numbers are uniquely associated with the Preamble numbers. The terminal configures, for the Preamble sequence, a CS-ZC sequence corresponding to a Preamble number selected at random. For example, even when a plurality of terminals transmit PRACHs using the same time resources and frequency resources, the base station is capable of detecting a plurality of Preamble numbers (in other words, Preamble signals of a plurality of terminals) simultaneously by detection of correlations between the CS-ZC sequences when the plurality of terminals select respective different Preamble numbers.

[Extension to Non-Terrestrial Network (NIN)]

In NR, extension to Non-Terrestrial Networks (NTNs) such as communications using a satellite and/or a high-altitude pseudolite (High-altitude platform station (HAPS)) is considered (e.g., see Non-Patent Literature (hereinafter referred to as "NPL") 1).

In an NTN environment, a satellite's coverage area (e.g., one or more cells) for a terrestrial terminal or a terminal on an aircraft is formed by beams from the satellite. In addition, the round-trip time of radio wave propagation between the terminal and the satellite is determined by the altitude of the satellite (e.g., up to about 36,000 km) and/or the angle viewed from the terminal.

For example, the satellite forms a cell with a diameter of several 100 km. The cell formed by the satellite is larger than a cell with a diameter of several km formed by a terrestrial base station or the like. Accordingly, the difference in the propagation delay of propagation between the terminal and the satellite is larger depending on the position of the terminal existing in the cell formed by the satellite.

For example, NPL 1 describes that in an NTN, the Round Trip Time (RTT) of radio wave propagation between a satellite and a terminal is about 544 ins. In addition, NPL 1 describes that a maximum delay difference of about 1.6 ins is caused depending on the location of the terminal within beams (within a cell). The maximum delay difference indicates, for example, a difference between, on one hand, the round-trip time between a terminal at the farthest location from the satellite and the satellite and, on the other hand, the round-trip time between a terminal at the nearest location from the satellite and the satellite within the beams (within the cell).

In a terrestrial cell with a diameter of several km, the maximum delay difference is less than 0.1 ms, for example. Thus, the maximum delay difference in the NTN is much greater than in time terrestrial cell. Therefore, in the NTN, the delay difference of Preambles received by the satellite from terminals is large.

Meanwhile, the random access procedure is not limited to initial access, but is also performed at the time of an uplink data transmission request, a SI request (a request by a terminal for System Information transmission from a base station), and a handover. In such applications, the terminal may be in timing synchronization with the base station, i.e., may have a Valid Timing Advance (TA) value. When the terminal has a valid TA value, the terminal adjusts a transmission timing by the TA value, thereby reducing the delay difference between Preambles of different terminals received by the satellite.

In view of the above, the present disclosure realizes an appropriate random access method in NR performed when the propagation delays of propagation between terminals and a base station differ between the terminals, by using a configuration of PRACH resources for a terminal having a valid TA value and a configuration of PRACH resources for a terminal not having the valid TA value.

Note that, in the following description, having a valid TA value may be described as "with TA" and not having a valid TA value may be described as "without TA." A terminal "with TA" corresponds to, for example, a terminal which receives a TA command periodically from a base station (satellite) and in which a TA timer (timeAlignmentTimer) described in NPL 2 is running. Further, a terminal "without TA" corresponds to, for example, a terminal which does not receive a TA command from a base station or in which the TA timer (timeAlignmentTimer) is not running.

Embodiment 1

[Overview of Communication System]

Figure 2:
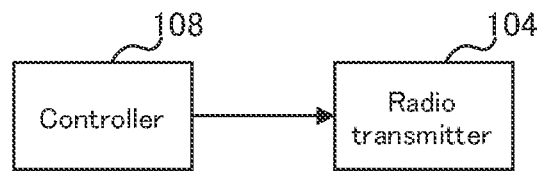
FIG. 2 is a block diagram illustrating a configuration of a part of a terminal according to Embodiment 1.

A communication system according to each embodiment of the present disclosure includes terminal 100 and base station 200. In the following description, by way of example, terminal 100 (corresponding to the transmission apparatus) transmits a signal of a PRACH (e.g., Preamble signal), and base station 200 (corresponding to the reception apparatus) receives the signal of the PRACH, FIG. 2 is a block diagram illustrating a configuration of a part of terminal 100 according to an embodiment of the present disclosure. In terminal 100 illustrated in FIG. 2, radio transmitter 104 transmits a signal of a random access channel. Controller 108 controls a resource configuration relevant to transmission of the signal in the random access channel based on a validity property of information on adjustment of a transmission timing.

Figure 3:
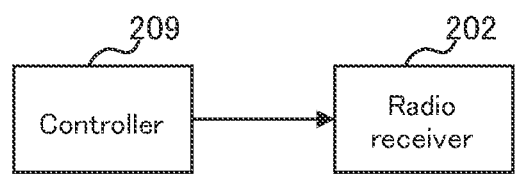
FIG. 3 is a block diagram illustrating a configuration of a part of a base station according to Embodiment 1.

FIG. 3 is a block diagram illustrating a configuration of a part of base station 200 according to an embodiment of the present disclosure. In base station 200 illustrated in FIG. 3, radio receiver 202 receives the signal of the random access channel. Controller 209 controls reception of the signal based on the resource configuration that is relevant to transmission of the signal in the random access channel, id that is associated with a validity property of information on adjustment of a transmission timing.

[Configuration of Terminal]

Figure 4:
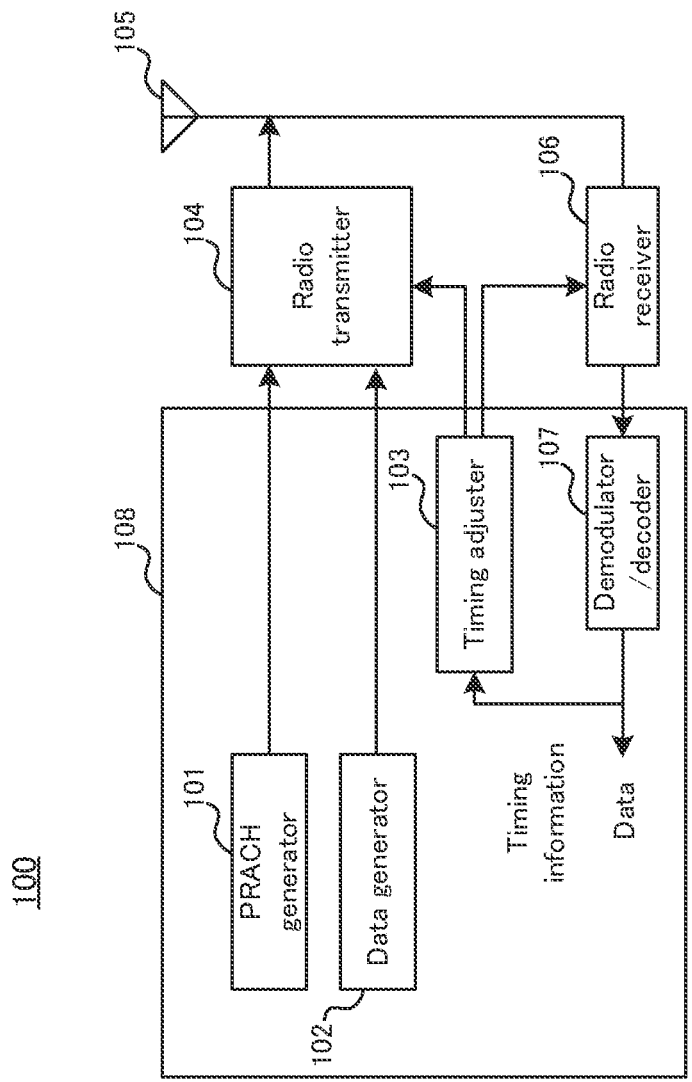
FIG. 4 is a block diagram illustrating a configuration example of the terminal according to Embodiment 1.

FIG. 4 is a block diagram illustrating an example of the configuration of terminal 100 according to Embodiment 1. Terminal 100 includes PRACH generator 101, data generator 102, timing adjuster 103, radio transmitter 104, antenna 105, radio receiver 106, and demodulator/decoder 107. PRACH generator 101, data generator 102, timing adjuster 103, and demodulator/decoder 107 may be included in controller 108.

PRACH generator 101 determines PRACH transmission resources from among candidates for PRACH transmission resources available within the cell of base station 200, for example. For example, PRACH generator 101 configures a time-frequency resource and a Preamble number to be used for PRACH transmission based on information on time-frequency resources and a Preamble number group available for the PRACH transmission. The information on the time-frequency resources and Preamble number group available for the PRACH transmission, for example, is notified by base station 200.

For example, PRAM generator 101 configures one Preamble number from the Preamble number group. PRACH generator 101 generates a CS-ZC sequence using a ZC sequence number and cyclic shift amount corresponding to the configured Preamble number, and generates the signal of the PRACH to be transmitted (e.g., Preamble signal) in the configured time-frequency resource.

Note that the information on PRACH transmission resource candidates available to terminal 100 (PRACH transmission resource information) includes configuration information on the PRACH such as candidates for the sequence number for a Preamble (Preamble number group), CS amount, PRACH time resources (e.g., periodicity), PRACH frequency resource positions, Preamble format numbers, and the like. In other words, the PRACH transmission resource information includes information used for generation of the Preamble signal of the PRACH and information on the time-frequency resource used for transmission of the Preamble signal of the PRACH. Further, the PRACH transmission resource information is included in control information (such as an RRC message (e.g., RACH-ConfigCommon, RACH-ConfigDedicated, and RACH-ConfigGeneric)) transmitted by connected base station 200 (e.g., a serving cell) and is notified to terminal 100 in the system information. Note that part of the control information may be system common information defined by the specifications, and does not have to be notified by base station 200 to terminal 100.

Note that, in the present embodiment, two types of PRACH transmission resource information are configured.

One of the two types is a resource used in the case of "with TA," for example, and the other is a resource used in the case of "without TA," for example. In the following, the resource used in the case of with TA" is referred to as "Type2_PRACH resource," and the resource used in the case of "without TA" is referred to as "Type1_PRACH resource."

Note that the Type1_PRACH resource and Type2_PRACH resource will be described later.

Data generator 102 generates an uplink transmission data sequence, and generates a data signal to be transmitted by time-frequency resources for data signal transmission allocated by base station 200 and a Modulation and Coding Scheme (MCS).

Timing adjuster 103 adjusts a reception timing of a reception signal, and a transmission timing of a transmission signal. For example, timing adjuster 103 adjusts the transmission timing based on TA notified by base station 200.

Note that timing adjuster 103 may perform timing adjustment based on the value of common TA notified by base station 200. The common TA is common within the cell. The value of the common TA is configured based on the RTT near the center of the cell. For example, when base station 200 is included in a geostationary satellite, the value of the common TA is about 540 ms.

When the timing is adjusted using the common TA, base station 200 configures the reception timing of an uplink signal based on a reference timing of a downlink signal. On the other hand, when the common TA is not used, base station 200 configures the reception timing of the uplink signal to a timing delayed by the value of the common TA from the reference timing of the downlink signal. The delay time difference within the cell is corrected by the value of TA for each terminal. Such TA for each terminal is hereinafter referred to as "specific TA."

Here, when terminal 100 has valid specific TA, timing adjuster 103 performs the timing adjustment based on the valid specific TA, and transmits the PRACH. When terminal 100 does not have valid specific TA, timing adjuster 103 does not use the value of the specific TA. In the case of a system using common TA, timing adjustment based on the common TA is performed. Note that, the specific TA becomes invalid when the TA command is not received from base station 200 within a predetermined time.

The case of not having valid specific TA is, for example, a case where initial access is performed, or a case where a TA command has not been received for a long time in an RRC_INACTIVE state. Note that, the case of "without TA" described above is the case of not having valid specific TA.

The case of having valid specific TA is, for example, a case where a transmission request for uplink data is performed in an RRC_ACTIVE condition, or the like. Note that, the case of "with TA" described above is the case of having valid specific TA.

Radio transmitter 104 performs transmission processing such as D/A conversion and/or up-conversion on the signal outputted from PRACH generator 101 and the data signal outputted from data generator 102, and transmits the radio signal obtained by the transmission processing from antenna 105 to base station 200.

Radio receiver 106 performs reception processing such as down-conversion and/or A/D conversion on a reception signal received from base station 200 via antenna 105, and outputs the signal subjected to the reception processing to demodulator/decoder 107.

Demodulator/decoder 107 performs demodulation and decoding processing on the signal outputted from radio receiver 106. For example, demodulator/decoder 107 demodulates and decodes a response data signal of the PRACH. For example, when the demodulated and decoded information includes timing information on a transmission timing and a reception timing (e.g., the common TA and/or specific TA), demodulator/decoder 107 outputs the timing information to timing adjuster 103.

[Configuration of Base Station]

Figure 5:
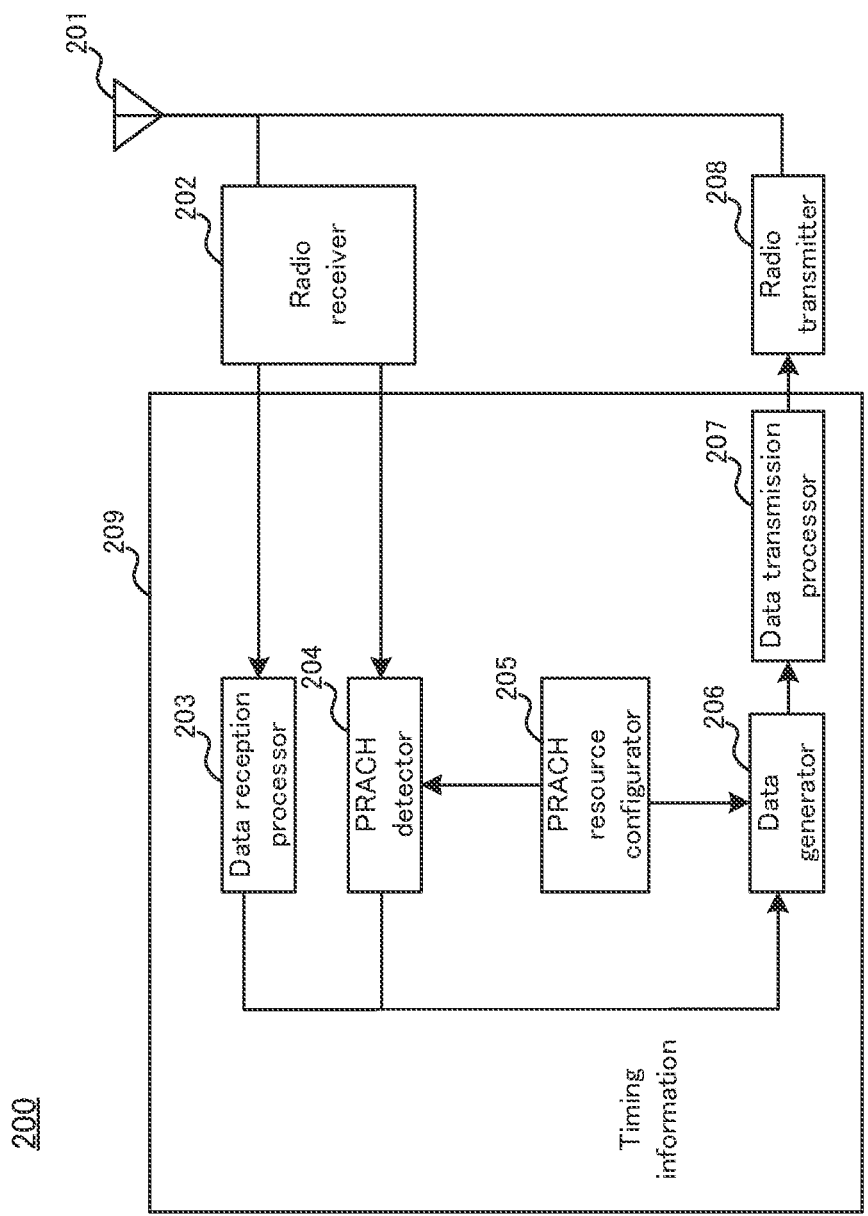
FIG. 5 is a block diagram illustrating a configuration example of the base station according to Embodiment 1.

FIG. 5 is a block diagram illustrating an example of the configuration of base station 200 according to the present embodiment. Base station 200 includes antenna 201, radio receiver 202, data reception processor 203, PRACH detector 204, PRACH resource configurator 205, data generator 206, data transmission processor 207, and radio transmitter 208. Data reception processor 203, PINCH detector 204, PRACH resource configurator 205, data generator 206, and data transmission processor 207 may be included in controller 209.

Radio receiver 202 performs reception processing such as down-conversion and/or A/D conversion on the data signal and PRACH signal received via antenna 201 from terminal 100, and outputs the signal subjected to the reception processing to data reception processor 203 and PRACH detector 204.

PRACH resource configurator 205 configures, for PRACH detector 204, the time-frequency resources and Preamble numbers available for PRACH transmission within the cell. In addition, PRACH resource configurator 205 outputs, to data generator 206, system information (e.g., Random Access Configuration information, RACH-Conic information, and the like) including the time-frequency resources and Preamble numbers available for PRACH transmission within the cell. Here, the time-frequency resources available for PRACH transmission may be referred to as "RACH Occasion."

In the present embodiment, as described above, two types of resources of Type1_PRACH resources and Type2_PRACH resources that are available for PRACH transmission are configured.

PRACH detector 204 detects the Preamble signal of the PRACH and estimates the transmission timing and the reception timing by performing, on the Preamble signal of the PRACH received, correlation processing between the Preamble signal and a replicated signal of the Preamble signal generated using a sequence number and cyclic shift amount corresponding to a Preamble number configured by PRACH resource configurator 205.

Note that the correlation processing performed by PRACH detector 204 may be a process performed in the time domain for calculating a delay profile, or a process of calculating the delay profile by performing IFFT after performing the correlation processing (division processing) in the frequency domain. The calculated delay profile may be used to estimate the transmission timing and/or reception timing.

Data reception processor 203 performs the demodulation and decoding processing on the received data signal. Further, data reception processor 203 may also perform channel estimation and timing estimation based on the received data signal.

Data generator 206 generates a downlink data signal including user data, system information, specific control information, and the like. Data generator 206 outputs the generated downlink data signal to data transmission processor 207.

Further, data generator 206 generates the TA command based on timing estimation results of estimation by PRACH detector 204 and data reception processor 203.

Data transmission processor 207 encodes and modulates the downlink data signal outputted from data generator 206, and outputs the modulated signal to radio transmitter 208.

Radio transmitter 208 performs transmission processing such as D/A conversion, up-conversion, and amplification on the signal outputted from data transmission processor 207, and transmits, via antenna 201, the radio signal obtained by the transmission processing.

Next, two types of PRACH transmission resources will be described.

Configuration Example 1 of PRACH Transmission Resource

An example of configuration of the PRACH resources by PRACH resource configurator 205 of base station 200 will be described.

Figure 6:
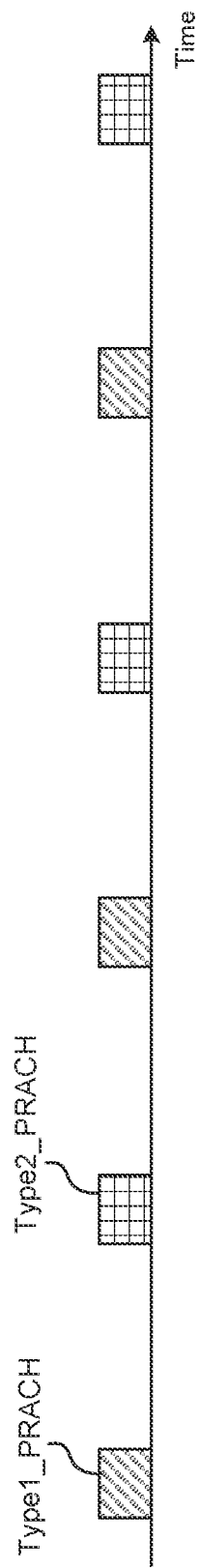
FIG. 6 illustrates a first mapping example of Type1_PRACH resources and Type2_PRACH resources.

FIG. 6 illustrates a first mapping example of Type1_PRACH resources and Type2_PRACH resources. FIG. 6 illustrates an example in which Type1_PRACH and Type2_PRACH resources are alternately mapped in the time domain.

In the example of alternate mapping in the time domain illustrated in FIG. 6, a time period between triggering of PRACH transmission and a timing at which transmission is possible is equal between terminal 100 with TA and terminal 100 without TA. It is thus possible to equalize access delays regardless of with or without TA.

Note that the mapping example is not limited to the example of FIG. 6. For example, the RACH Occasion number defined in the time domain and/or frequency domain may be configured differently between Type1_PRACH resources and Type2_PRACH resources. For example, even RACH Occasion numbers are configured for either of the Type1_PRACH resources and the Type2_PRACH resources, and odd RACH Occasion numbers are configured for the other of the Type1_PRACH resources and the Type2_PRACH resources. Also in such a configuration, the Type1_PRACH resources and the Type2_PRACH resources are configured at an equal frequency to each other. Thus, the time period between triggering of PRACH transmission and a timing at which transmission is possible is equal between terminal 100 with TA and terminal 100 without TA. It is thus possible to equalize access delays regardless of with or without TA.

Figure 7:
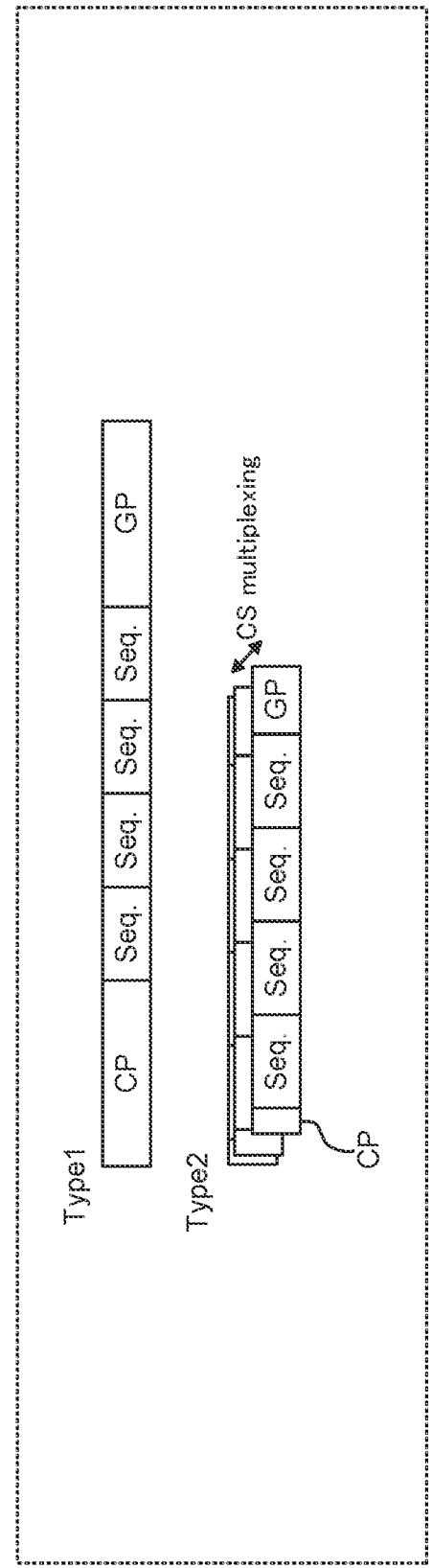
FIG. 7 illustrates a first example of a configuration of a Preamble signal of Type1_PRACH and a configuration of a Preamble signal of Type2_PRACH.

FIG. 7 illustrates the first example of the configuration of the Preamble signal of Type1_PRACH and the configuration of the Preamble signal of Type2_PRACH. In FIG. 7, the configuration of the Preamble signal of Type1_PRACH (Type1 in FIG. 7) and the configuration of the Preamble signal of Type2_PRACH (Type2 in FIG. 7) are illustrated side by side.

Here, the Preamble signal of Type1_PRACH is a Preamble signal generated based on the information on the Type1_PRACH resources, and the Type2_PRACH signal is a signal generated based on the information on the Type2_PRACH resources. Note that, in the following, the configuration of the Preamble signal of Type1_PRACH may be described as "Type1_PRACH configuration," and the configuration of the Preamble signal of Type2_PRACH may be described as "the Type2_PRACH configuration."

In the Type1_PRACH configuration and the Type2_PRACH configuration in FIG. 7, one code sequence ("Seq." in FIG. 7) is repeated four times, where the code sequences have the same sequence length as one another.

For example, the Type1_PRACH configuration has a longer CP length than the Type2_PRACH configuration. The Type1_PRACH configuration has a longer GP length than the Type2_PRACH configuration. In addition, the Type1_PRACH configuration is not multiplexed by a cyclic shift sequence. In other words, in the Type1_PRACH configuration, the number of CSs are defined as one. Further, the Type2_PRACH configuration is multiplexed by a cyclic shift sequence. For example, the number of CSs is defined as $N_{CS}$ ($N_{CS}$ may be an integer greater than or equal to 1) in the Type2_PRACH configuration.

In the example of FIG. 7, the number of Preamble signals that can be multiplexed in the Type1_PRACH configuration is $1N_{CS}$ of the number of Preamble signals in the Type2_PRACH configuration because CS multiplexing is not performed in the Type1_PRACH configuration. However, when PRACH resource configuration is to be performed for terminals mounted on a mobile entity such as an aircraft and/or a vessel, the number of terminals in the initial access or RRC_INACTIVE state is small, and the number of occasions for PRACH transmission using the Type1_PRACH configuration is small. Therefore, even when the number of Preamble signals that can be multiplexed in the Type1_PRACH configuration is small, it is possible to avoid an increase in probability of collision of Preamble signals between terminals.

Note that, although FIG. 7 illustrates an example in which the differences between the Type1_PRACH configuration and the Type2_PRACH configuration are a difference in CP length, a difference in GP length, and a difference in multiplexing by the CS, the present disclosure is not limited to this example. For example, the differences between the Type1_PRACH configuration and the Type2_PRACH configuration may be at least one of the difference in CP length, the difference in GP length, and the difference in multiplexing by the CS.

In addition, the Typed PRACH configuration is a configuration in which multiplexing is not performed by the cyclic shift sequence, that is, a configuration in which CS=1, but the present disclosure is not limited thereto. For example, in the Type1_PRACH configuration, multiplexing by the cyclic shift sequence may be performed. In this case, the number of multiplexing (CSs) in the Type1_PRACH configuration may be less than in the Type2_PRACH configuration.

Further, the Type1_PRACH configuration may be the same as the Type2_PRACH configuration, while the RACH occasion may be different between the Type1_PRACH resource configuration and the Type2_PRACH resource configuration. For example, the RACH occasion in the Type1_PRACH resource configuration may differ from the RACH occasion in the Type2_PRACH resource configuration at least in one of time and frequency.

For example, both of the Type1_PRACH configuration and the Type2 PRACH configuration may be configurations in which CS multiplexing can be performed. The Type1_PRACH configuration is used by terminal 100 without TA, and the Type2_PRACH configuration is used by terminal 100 with TA. In this case, because the propagation delay difference between terminals 100 without TA is longer than the CS amount, base station 200 cannot distinguish a Preamble signal of terminal 100 without TA on which CS multiplexing is performed the base station cannot substantially perform CS multiplexing). Base station 200 ignores the CS of the Type1_PRACH configuration and distinguishes the Preamble signal of terminal 100 without TA using a ZC sequence. Also in this case, the transmission occasion (RACH Occasion) differs between terminal 100 with TA and terminal 100 without TA. Accordingly, CS multiplexing between terminals 100 with TA is possible, thus allowing reduction in the collision probability or reduction in the PRACH resources.

Further, increasing the CP length is equivalent to increasing the number of repetitions of the code sequence. Hereinafter, a description will be given in this respect with reference to FIG. 8.

Figure 8:
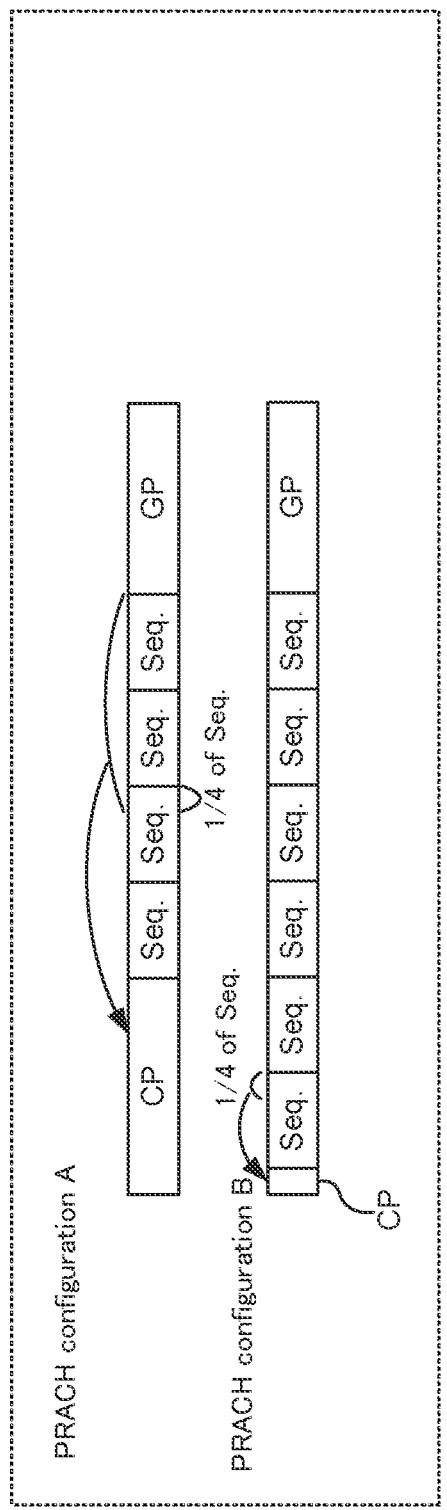
FIG. 8 illustrates exemplary PRACH configurations.

FIG. 8 illustrates exemplary PRACH configurations. FIG. 8 illustrates two configurations of PRACH configuration A and PRACH configuration B.

In PRACH configuration A, one code sequence (one "Seq." in FIG. 8) is repeated four times. In addition, in PRCH configuration A, a CP having a length corresponding to two code sequences and ¼ of the one code sequence is attached to the front.

In PRACH configuration B, one code sequence having the same sequence length as the one code sequence of PRACH configuration A is repeated six times. In addition, in PRACH configuration B, a CP having a length corresponding to ¼ of the length of the one code sequence is attached to the front.

In both of PRACH configuration A and PRACH configuration B, one code sequence is repeated six times, and a length of ¼ of one code sequence is attached to the front.

As is understood, PRACH configuration A in which the CP length is longer is equivalent to PRACH configuration B in which the number of repetitions of the code sequence is greater.

Configuration Example 2

Figure 9:
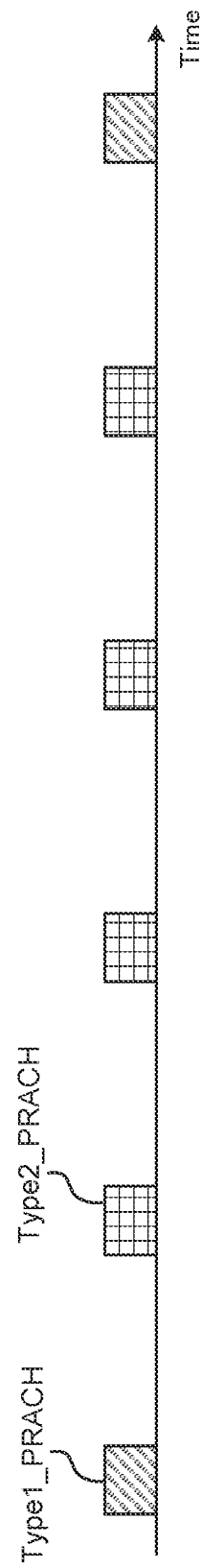
FIG. 9 illustrates a second snapping example of Type1_PRACH resources and Type2_PRACH resources.

FIG. 9 illustrates a second snapping example of Type1_PRACH resources and Type2_PRACH resources. FIG. 9 illustrates mapping of Type1_PRACH resources and Type2_PRACH resources. In FIG. 9, the number of mapped Type1_PRACH resources in the time domain is less than the number of mapped Type2_PRACH resources. In other words, the frequency of Type1_PRACH resources is less than the frequency of Type2_PRACH resources.

With the mapping illustrated in FIG. 9, the time period between triggering of PRACH transmission and the timing at which the PRACH transmission can be performed by terminal 100 with TA can be made shorter than such a time period for terminal 100 without TA.

Note that, although FIG. 9 illustrates the example in which the frequency of the Type1_PRACH resources is less than the frequency of the Type2_PRACH resources in the time domain, the present disclosure is not limited to this example. For example, the RACH Occasion number defined in the time domain and; or the frequency domain may be configured more for the Type2_PRACH resources than for the Type1_PRACH resources. Also in such a configuration, the time period between triggering of PRACH transmission and the timing at which the PRACH transmission can be performed by terminal 100 with TA can be made shorter than such a time period for terminal 100 without TA.

In many cases, when an NTN environment is used for communication of a mobile entity, such as an aircraft and vessel, an antenna and a communication module of the mobile entity, in general, receive a reception signal, are then typically bridged to Wi-Fi (registered trademark) inside the mobile entity (e.g., within the aircraft or within the vessel, etc.), and the reception signal is transferred to a terminal possessed by a user inside the mobile entity. Thus, terminal 100 without TA performs PRACH transmission in limited cases such as immediately after departure of the mobile entity (e.g., takeoff of the aircraft or departure of the vessel). In such cases, occurrence of a delay in PRACH transmission is not so problematic. On the other hand, in the case of terminal 100 with TA, a transmission delay in a transmission request of uplink data or the like influences the user experience. In this case, the user experience can be improved by increasing the frequency of PRACH transmissions of terminal 100 with TA by mapping more Type PRACH resources.

Further, when the size of Type1_PRACH resources (e.g., the length of the Preamble signal of Type1_PRACH) is larger than the size of Type2_PRACH resources, the overhead can be reduced by reducing the frequency of Type1_PRACH transmissions.

Note that, in the example of FIG. 9, the frequency of transmissions of the Preamble signal of Type2_PRACH increases. For example, by adjusting the length of a Preamble sequence, such as, e.g., the length of the code sequence and/or the number of repetitions of the code sequence between the Preamble signal of Type2_PRACH and the Preamble signal of Type1_PRACH, the resource consumption due to an increase in the frequency of transmissions of the Preamble signal of Type2_PRACH may be reduced. Hereinafter, examples of the Type1_PRACH configuration and the Type2_PRACH configuration for reducing the resource consumption due to an increase in the frequency of transmissions of the Preamble signal of Type2_PRACH will be described with reference to FIGS. 10 and 11.

Figure 10:
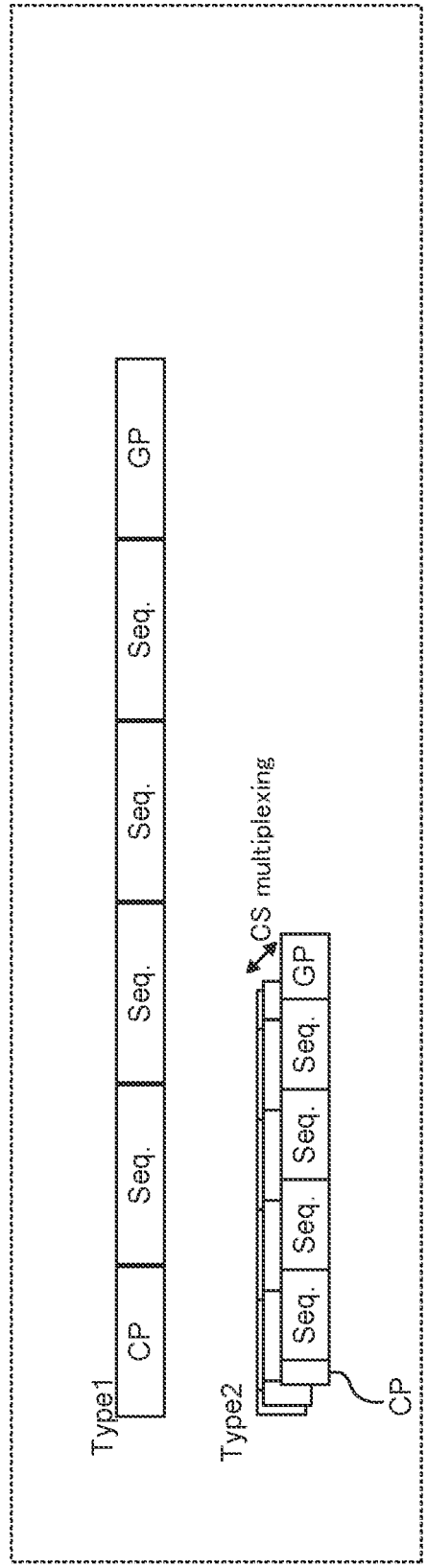
FIG. 10 illustrates the second example of the Type1_PRACH configuration and the Type2_PRACH configuration.

FIG. 10 illustrates the second example of the Type1_PRACH configuration and the Type2_PRACH configuration. In FIG. 10, the Type1_PRACH configuration (Type1 in FIG. 10) and the Type2_PRACH configuration (Type2 in FIG. 10) are illustrated side by side.

In both of the Type1_PRACH configuration and the Type2_PRACH configuration in FIG. 10, one code sequence is repeated four times. However, the length of the code sequence used in the Type1_PRACH configuration is longer than that in the Type2_PRACH configuration. For example, in the Type1_PRACH configuration, a ZC sequence with a sequence length of 839 is used, and in the Type2_PRACH configuration, a ZC sequence with a sequence length of 139 is used.

Figure 11:
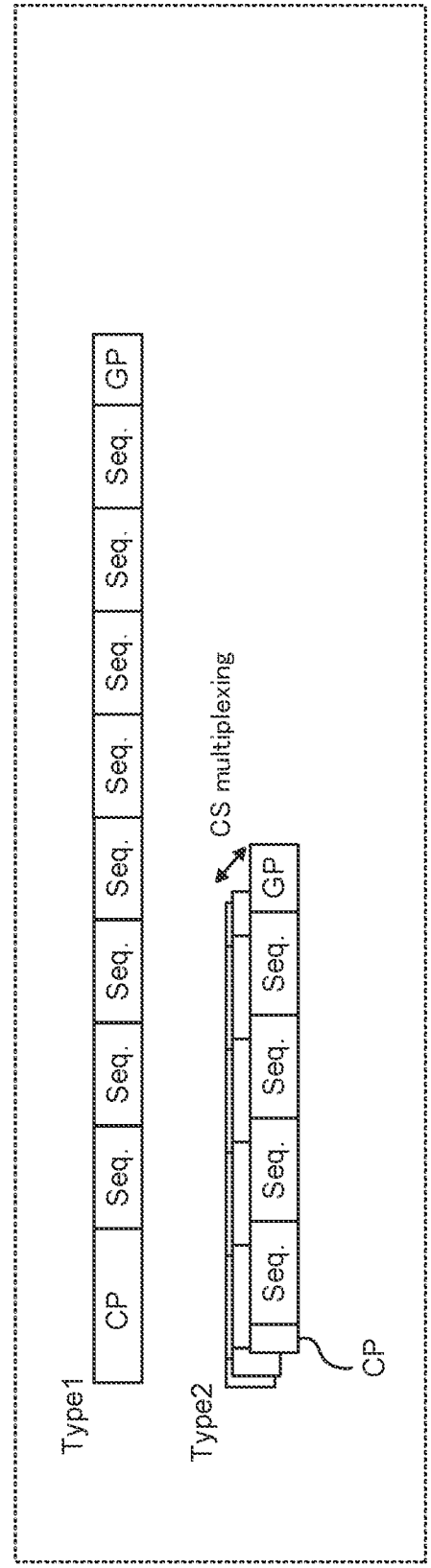
FIG. 11 illustrates the third example of the Type1_PRACH configuration and the Type2_PRACH configuration.

FIG. 11 illustrates the third example of the Type1_PRACH configuration and the Type2_PRACH configuration. In FIG. 11, the Type1_PRACH configuration and the Type2_PRACH configuration are illustrated side by side.

In both of the Type1_PRACH configuration and the Type2_PRACH configuration in FIG. 11, one code sequences have the same length. For example, a ZC sequence having a sequence length of 839 or a sequence length of 139 is used for one code sequence. However, in the Type1_PRACH configuration, the number of repetitions of the code sequence is configured to 8, and in the Type2_PRACH configuration, the number of repetitions of the code sequence is configured to 4. As is understood, the number of repetitions of the code sequence may be configured more greatly in the Type1_PRACH configuration than in the Type2_PRACH configuration.

In the NTN environment, a communication area is covered by a directional sharp beam formed by a satellite. In addition, in the cases of an aircraft moving in the sky and a vessel moving on the sea or the like, there are fewer reflective objects in their surroundings in comparison to a terrestrial area. Accordingly, delay dispersion in a propagation path is small in many cases in comparison to a TN environment. For example, since a larger number of CSs can be configured per one code sequence e.g., one ZC sequence) in the Type2_PRACH configuration, interference between different code sequences is less likely to be caused than in the Type1_PRACH configuration in which CS multiplexing is not performed. Thus, a shorter sequence length can be used and; or the number of repetitions of sequences can be reduced in the Type2_PRACH configuration in comparison with the Type1_PRACH configuration. It is thus possible to maintain adequate detection accuracy for a Preamble signal and to reduce resources.

As described above, the number of Preambles that can be generated from a single ZC sequence is less in the Type1_PRACH configuration than in the Type2_PRACH configuration, when CS multiplexing is not performed in the Type1_PRACH configuration.

In LTE and NR, the number of CS-ZC sequences is defined as 838× (the number of CSs) when a ZC sequence having a sequence length of 839 is used, and defined as 138× (the number of CSs) when a ZC sequence having a sequence length of 139 is used. Further, in LTE and NR, up to 64 CS-ZC sequences per cell are configured by a system, for example. The higher the number of CS-ZC sequences per cell, the lower the probability of PRACH collisions within the cell. On the other hand, the larger the number of CS-ZC sequences per cell, the shorter the distance between cells using the same CS-ZC sequence, resulting in an increase in the effect of interference with other cells. Further, the smaller the number of CS-ZC sequences per cell, the higher the probability of PRACH collisions within the cell. On the other hand, the smaller the number of CS-ZC sequences per cell, the longer the distance between cells using the same CS-ZC sequence, resulting in a decrease in the effect of interference with other cells. Note that, the distance between the cells using the same sequence may be described as a cell reuse factor.

In the present embodiment, the number of sequences in the Type1_PRACH configuration per cell is configured smaller than that in the Type2_PRACH configuration.

Since CS multiplexing is not performed, the number of possible code sequences in the Type1_PRACH configuration is smaller than that in the Type2_PRACH configuration. In addition, the number of occasions of using the Type1_PRACH configuration is considered to be smaller than that of the Type2_PRACH configuration. Thus, the number of code sequences in the Type1_PRACH configuration per cell is made smaller than that in the Type2_PRACH configuration, thereby increasing the cell reuse factor to be secured.

On the other hand, in the Type2_PRACH configuration, the number of sequences per cell is made greater than in the Type1_PRACH configuration to prioritize collision avoidance. Also in this case, the CS multiplexing is possible and the number of CS-ZC sequences is large in the Type2_PRACH configuration, and accordingly, securing a satisfactory cell reuse factor is also possible. This makes it possible to reduce the probability of collisions and ensure the cell reuse factor for each of Type1 and Type2.

For example, in the NTN environment, a cell is formed by a beam formed by a single satellite. Accordingly, a signal power difference between one cell and another is determined by the directivity characteristics of the beam rather than distance attenuation of radio waves. Therefore, interference with other cells is more remarkable than in the TN environment (e.g., a terrestrial cellular environment). According to the examples described above, it is possible to reduce the effect of interference with other cells by securing the cell reuse factor in the NTN environment.

Note that, in the NR, the number of CS-ZC sequences per cell is notified by higher layer signaling (e.g., by totalNumberOfRA-Preamble that is one of the RRC parameters).

Although the above resource configuration examples have been described, information on the Type1_PRACH resource configuration (Type1_PRACH resource configuration information) and information on the Type2_PRACH resource configuration (Type2_PRACH resource configuration information) may be independently notified by base station 200 so as to enable flexible switching corresponding to the environment. For example, the Type1_PRACH resource configuration information and the Type2_PRACH resource configuration information may be included in the system information for being notified. In this case, the frequency, the sequence length, the number of sequences per cell, the CP length, the number of CSs, and the like of each of the Type1_PRACH resource and the Type2_PRACH resource specific to each of Type1_PRACH transmission and Type2_PRACH transmission can be configured. Thus, flexible operation depending on the cell environment or the like is possible.

Embodiment 1 described above has been described in relation to the example in which the resource configuration relevant to PRACH transmission by terminal 100 without TA (Type1_PRACH resource configuration) and the resource configuration relevant to PRACH transmission by terminal 100 with TA (Type2_PRACH resource configuration) are configured. With this configuration, it is possible to appropriately perform random access processing even when the propagation delays of propagation between terminals 100 and base station 200 are different between the terminals.

For example, terminal 100 with TA reduces the difference (delay difference) in propagation delay between terminals by performing timing adjustment. Thus, terminal 100 with TA can use a Preamble signal with a short CP length and on which CS multiplexing is performed, so as to achieve reduction in radio resources for the PRACH and reduction in the probability of collision between Preamble signals.

Further, for example, terminal 100 without TA does not perform timing adjustment for reducing the difference in the propagation delay between terminals, but can achieve reduction in the probability of collision between Preamble signals by giving a Preamble a CP length dependent on the delay difference between the terminals.

For example, when a delay difference greater than or equal to half the sequence length of the code sequence of the Preamble signal occurs. CS multiplexing is difficult, and the total number of Preamble signals that can be generated with the CS-ZC sequence decreases. In the present embodiment, terminal 100 with TA reduces the delay difference by performing timing adjustment, so as to be capable of performing CS multiplexing. It is thus possible to secure the number of Preamble signals correspondingly, to achieve reduction in the probability of collision between the Preamble signals.

Further, for example, when a delay difference greater than or equal to half the sequence length of the code sequence of the Preamble signal occurs, it is conceivable to use, for the Preamble signal, a code sequence having a longer sequence length than conventional. However, the use of the code sequence having a longer sequence length than conventional increases complexity of terminal 100 and the satellite (base station 200). According to the present embodiment, terminal 100 with TA reduces the delay difference by performing timing adjustment. It is thus possible to limit the use of the code sequence having a longer sequence length to the case of terminal 100 without TA, to reduce an increase in the complexity of terminal 100 and the satellite (base station 200).

Note that, Embodiment 1 described above has been described in relation to the example in which terminal 100 without TA uses the Type1_PRACH resource configuration, and terminal 100 with TA uses the Type2_PRACH resource configuration, but the present disclosure is not limited to this example. For example, terminal 100 may use the Type1_PRACH resource configuration and the Type2_PRACH resource configuration selectively.

For example, when terminal 100 with TA transmits MSG1 (see FIG. 1) by performing a random access procedure using the Type2_PRACH resource configuration, and, if terminal 100 fails the MSG1 transmission, terminal 100 with TA may perform the random access procedure using the Type1_PRACH resource configuration in the next MSG1 transmission.

In this instance, for example, PRACH generator 101 of terminal 100 generates a Preamble signal of Type2_PRACH, and radio transmitter 104 transmits the Preamble signal of Type2_PRACH. In the transmission of the Preamble signal of Type2_PRACH, the transmission timing is adjusted by timing adjuster 103. Then, when the transmission of the Preamble signal of Type2_PRACH fails, PRACH generator 101 generates a Preamble signal of Type1_PRACH, and radio transmitter 104 transmits the Preamble signal of Type1_PRACH. In the transmission of the Preamble signal of Type1_PRACH, the transmission timing does not have to be adjusted by timing adjuster 103. When the transmission timing is not adjusted in the transmission of the Preamble signal of Type1_PRACH, it is possible to avoid arrival of the Preamble signal at base station 200 at a timing earlier than a timing at which base station 200 receives a Preamble signal transmitted by terminal 100 without TA, so as to enable reception by base station 200 without extension of a reception window.

Here, the determination of the failure of MSG1 transmission is not particularly limited. For example, terminal 100 may determine the PRACH transmission failure when failing to receive MSG2 (see FIG. 1) before a predetermined time elapses (e.g., before MSG2 timer expiration). Alternatively, when failing to receive MSG2 before the predetermined time elapses (e.g., MSG2 timer expiration) after PRACH transmission, terminal 100 may retransmit the PRACH, and terminal 100 may determine the failure when failing to receive MSG2 even after a predetermined number of retransmissions. Alternatively, terminal 100 may increase transmit power by a predetermined value each time the PRACH is retransmitted, and judge that the transmission fails when the transmit power reaches the upper limit. Note that, the process of increasing the transmit power for each time the PRACH is retransmitted may be referred to as "Ramping Up."

Also in the case of terminal 100 with TA, influences of unexpected terminal movement, changes in a situation of reflection of radio waves, and the like cause a deviation in timing synchronization. Even when the PRACH transmission fails due to such a deviation in timing synchronization, terminal 100 can reduce the probability of transmission failure by using, for a retrial after the transmission failure, the Type1_PRACH that is highly resistant to the deviation in timing synchronization.

Embodiment 2

In Embodiment 2, the 2-step random access (2-Step RACH) is used in addition to the 4-step random access (4-step RACH) of LTE and NR Rel 15. In addition, in Embodiment 2, a terminal selectively uses resources for use in PRACH transmission depending on a situation.

Figure 12:
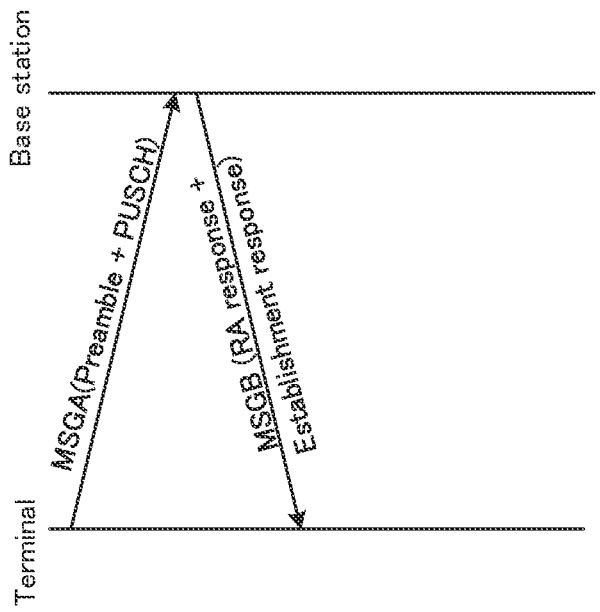
FIG. 12 illustrates an example of a 2-step random access procedure.

FIG. 12 illustrates an example of the 2-step random access procedure. In the 2-step random access, the terminal transmits a Preamble signal (corresponding to MSG31 of FIG. 1) of a PRACH and data (corresponding to MSG3 of FIG. 1) simultaneously, continuously in time, or within a predetermined time period (e.g., within one slot) in transmission (MSGA) at the first step. That is, prior to receiving a response to the Preamble from a base station, the terminal transmits the data corresponding to MSG3 in FIG. 1. For example, the data is transmitted in a PUSCH.

The base station receives and decodes MSGA (Preamble and data) and notifies an uplink transmission timing, Connection establishment response, and the like (corresponding to MSG2 and MSG4 in FIG. 1) in transmission (MSGB) at the second step.

The 2-step random access reduces the time taken for the random access procedure. On the other hand, since the PUSCH signal (data) is transmitted in addition to the Preamble in the transmission at the first step (MSGA in FIG. 12), a subsequent step (MSGB in FIG. 12) cannot be performed unless both the data and the Preamble are correctly detected by the base station.

In Embodiment 2, attention is paid to a low probability of PUSCH transmission failure as a result of the presence of valid TA in the cases of an uplink transmission request, SI request, handover, and the like. In this case, the 2-step random access is used. Further, in a case where there is no valid TA, such as in the initial access, the probability of PUSCH transmission failure is high. Thus, the 4-step random access is used. In other words, the 2-step random access is performed when there is TA, and the 4-step random access is performed when there is no TA.

Note that, the configuration of the terminal according to Embodiment 2 is the same as that of terminal 100 according to Embodiment 1, but operations are partly different between Embodiments 2 and 1. Note also that, the configuration of the base station according to Embodiment 2 is the same as that of base station 200 according to Embodiment 1, but operations are partly different between Embodiments 2 and 1. Different operations between the configurations will be described later. Embodiment 2 will be described using the same reference numerals as those in Embodiment 1.

Figures 13A, 13B:
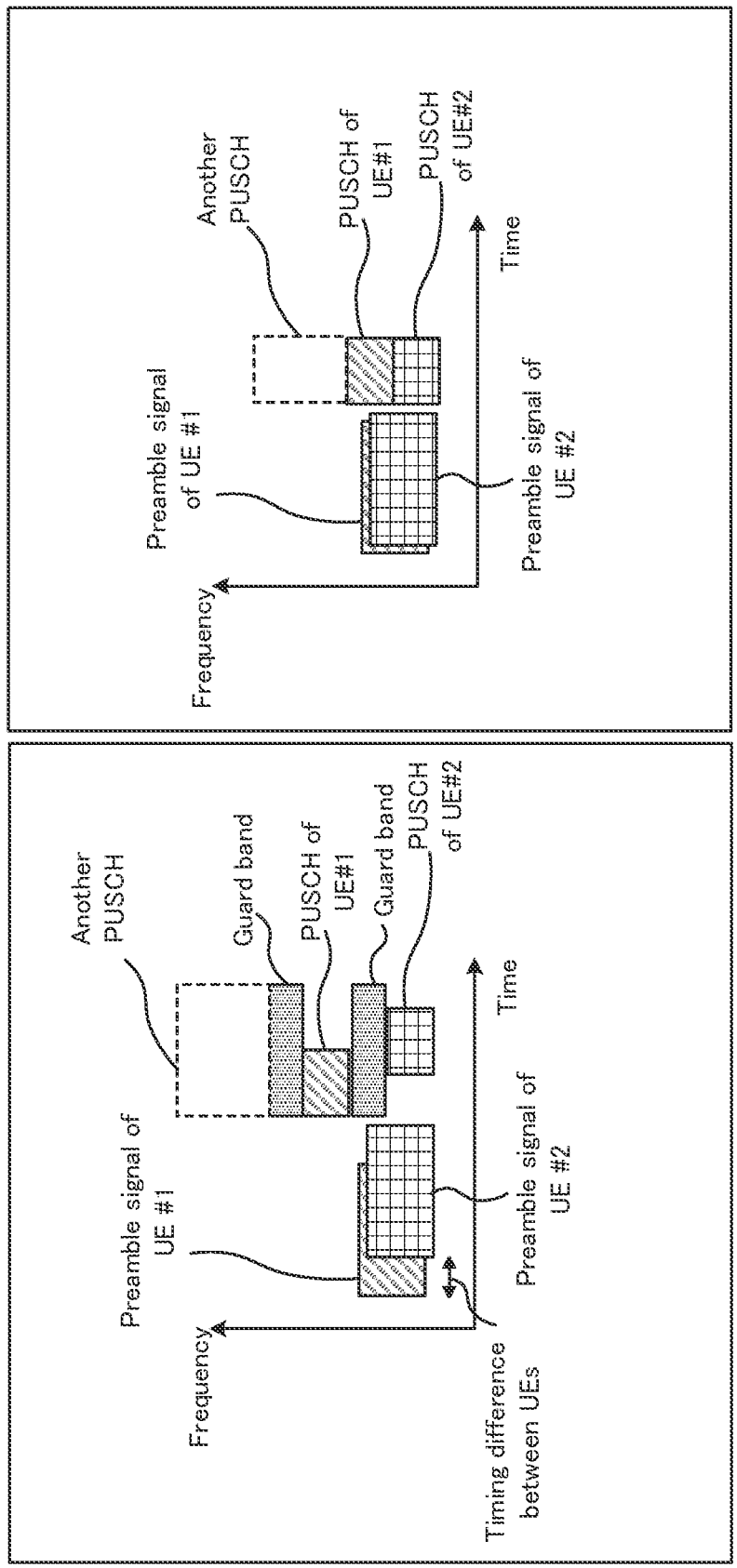
FIG. 13A illustrates a first example of signal mapping in the 2-step random access.
FIG. 13B illustrates a second example of signal mapping in the 2-step random access.

FIG. 13A illustrates a first example of signal mapping in the 2-step random access. FIG. 13B illustrates a second example of signal mapping in the 2-step random access. The horizontal axes in FIGS. 13A and 13B indicate time, and the vertical axes indicate frequency. Each of FIGS. 13A and 13B illustrates the example of mapping of Preamble signals and PUSCHs in PRACHs of two terminals 100 (UE #1 and UE #2) in the time domain and the frequency domain, FIG. 13A is signal mapping in a case where terminals 100 without TA perform the 2-step random access, and FIG. 13B is signal mapping in a case where terminals 100 with TA perform the 2-step random access.

For example, when a delay difference within a cell is large, the reception timings of PUSCHs at base station 200 are greatly different between terminals. Therefore, when terminal 100 without TA performs the 2-step random access, a large guard band and a large guard time are provided in order to avoid interference with uplink transmission data of another terminal as illustrated in FIG. 13A. Accordingly, when terminals 100 without TA perform the 2-step random access, the resource utilization efficiency is reduced.

On the other hand, even when the delay difference within the cell is large, terminals 100 with TA perform timing adjustment by TA, thereby preventing a deviation in reception timing between the terminals. Therefore, when terminals 100 with TA preform the 2-step random access, it is not necessary to provide a guard band and a guard time as illustrated in FIG. 13B.

In Embodiment 2, in the case of terminals 100 without TA, providing a large guard band and/or guard time is avoided by performing the 4-step random access. Accordingly, the resource utilization efficiency is improved.

In addition, in Embodiment 2, a resource that is different from that for the 4-step random access is used as a resource used for PRACH transmission in the 2-step random access.

Note that, in the 2-step random access, terminal 100 may transmit the Type1_PRACH Preamble in a Type1_PRACH resource and transmit a PUSCH signal (data) with TA. In this instance, the Type1_PRACH Preamble may be transmitted without TA.

When successfully receiving both of the Preamble and the PUSCH signal, the base station performs a reply (e.g., transmission of MSG2) in the 2-step random access. It is thus possible to reduce latency in the random access procedure. On the other hand, when successfully receiving the Preamble but not receiving the PUSCH signal, base station 200 can switch to the 4-step random access to continue the random access procedure.

[Configuration of Terminal]

The configuration of terminal 100 according to Embodiment 2 will be described with reference to FIG. 4 illustrating the configuration of terminal 100 according to Embodiment 1. The configuration of terminal 100 is the same as that of Embodiment 1, but differs from that of Embodiment 1 in the operations of PRACH generator 101, timing adjuster 103, and data generator 102. Hereinafter, processing in the case where terminal 100 according to Embodiment 2 is terminal 100 with TA and in the case where terminal 100 according to Embodiment 2 is terminal 100 without TA will be described.

[Case of Terminal 100 with TA]

PRACH generator 101 generates a Preamble signal of Type2_PRACH to be transmitted with time-frequency resources for the 2-step random access.

The Preamble signal of Type2_PRACH is transmitted via radio transmitter 104 and antenna 105. In this instance, timing adjuster 103 adjusts the transmission timing of the Preamble signal of Type2_PRACH based on TA (specific TA).

Data generator 102 generates the PUSCH signal including a data signal corresponding to MSG3 of FIG. 1.

The PUSCH signal is transmitted via radio transmitter 104 and antenna 105 after transmission of the Preamble signal of Type2_PRACH. In this instance, timing adjuster 103 adjusts the transmission timing of the PUSCH signal in the same manner as adjustment for the Preamble signal of Type2_PRACH.

[Case of Terminal 100 Without TA]

PRACH generator 101 generates a Preamble signal of Type1_PRACH to be transmitted with time-frequency resources for the 4-step random access.

The Preamble signal of Type1_PRACH is transmitted via radio transmitter 104 and antenna 105. In this instance, timing adjuster 103 adjusts the transmission timing of the Preamble signal of Type1_PRACH without based on TA (specific TA) (e.g., based on common TA). Note that, in the transmission of the Preamble signal of Type1_PRACH, the transmission timing does not have to be adjusted by timing adjuster 103.

As in Embodiment 1, data generator 102 receives MSG2 (see FIG. 1) that is a response to the transmitted Preamble signal, and then generates a PUSCH signal including a data signal of MSG3 (see FIG. 1).

The PUSCH signal is transmitted via radio transmitter 104 and antenna 105. In this instance, timing adjuster 103 may adjust the transmission timing of the PUSCH signal, for example, based on timing information received in MSG2 (see FIG. 1).

[Configuration of Base Station]

The configuration of base station 200 according to Embodiment 2 will be described with reference to FIG. 5 illustrating the configuration of base station 200 according to Embodiment 1. The configuration of base station 200 according to Embodiment 2 is the same as that of Embodiment 1, but the below-described processing is added.

PRACH detector 204 performs detection of both Preamble signals of the PRACH for the 4-step random access (i.e., Type1_PRACH) and the PRACH for the 2-step random access (i.e., Type2_PRACH).

In a case where PRACH detector 204 detects the Preamble signal of the PRACH for the 4-step random access, data reception processor 203 receives a PUSCH signal (MSG3 (see FIG. 1)) to be transmitted by terminal 100 after a PRACH response (MSG2 (see FIG. 1)) is transmitted by base station 200, and performs demodulation and decoding processing.

Further, in a case where PRACH detector 204 detects the Preamble signal of the PRACH for the 2-step random access, data reception processor 203 performs the demodulation and decoding processing on the PUSCH signal (MSG3 (see FIG. 1)) to be received after the Preamble signal of the PRACH. Note that, in this instance, base station 200 does not need to transmit the PRACH response (MSG2 (see FIG. 1)).

Embodiment 2 described above has been described in relation to the example in which the resource configuration relevant to PRACH transmission by terminal 100 without TA (Type1_PRACH resource configuration) and the resource configuration relevant to PRACH transmission by terminal 100 with TA (Type2_PRACH resource configuration) are configured as in Embodiment 1. In addition, in Embodiment 2, the terminal selectively uses the resource configurations depending on the situation. For example, in the terminal, a resource that is different from that for the 4-step random access is used as a resource used for PRACH transmission in the 2-step random access. For example, the Type1_PRACH resource configuration is used in the 4-step random access, and the Type2_PRACH resource configuration is used in the 2-step random access.

With this configuration, even when the propagation delays between terminals 100 and base station 200 are different between the terminals, the random access processing (2-step random access or 4-step random access) can be appropriately performed. Further, it is possible to achieve a shortened random access procedure.

Note that, the 2-step random access and the 4-step random access may be combined together. For example, terminal 100 with TA performs timing adjustment based on a specific TA value, and transmits the Preamble signal and the PUSCH signal of Type2_PRACH for the 2-step random access. Then, when transmission of the Preamble signal and/or the PUSCH signal of Type PRACH for the 2-step random access fail, terminal 100 with TA may perform a retrial by the 4-step random access in which the Preamble signal of Type1_PRACH is transmitted in the first step.

Here, terminal 100 may determine the transmission failure in the same manner as in Embodiment 1. For example, terminal 100 may determine the PRACH transmission failure when failing to receive MSG2 (see FIG. 1) before a predetermined time elapses (e.g., before MSG2 timer expiration). Alternatively, when failing, to receive MSG2 before the predetermined time elapses (e.g., MSG2 timer expiration) after PRACH transmission, terminal 100 may retransmit the PRACH, and terminal 100 may determine the failure when failing to receive MSG2 even after a predetermined number of retransmissions. Alternatively, terminal 100 may increase transmit power by a predetermined value each time the PRACH is retransmitted, and judge that the transmission fails when the transmit power reaches the upper limit. Note that, the process of increasing the transmit power for each time the PRACH is retransmitted may be referred to as "Ramping Up."

Also in the case of terminal 100 with TA, influences of unexpected terminal movement, changes in a situation of reflection of radio waves, and the like cause a deviation in timing synchronization. Even when the PRACH transmission fails due to such a deviation in timing synchronization, terminal 100 can reduce the probability of transmission failure by using the Type1 PRACH that is highly resistant to the deviation in timing synchronization for a retrial after the transmission failure. Further, the use of the 4-step random access eliminates the case of PRACH transmission failure due to a PUSCH reception error at base station 200. Thus, more robust PRACH transmission can be achieved and the probability of further transmission failure can be reduced.

In addition, terminal 100 with TA may transmit the Preamble signal of Type1_PRACH and the PUSCH signal in the 2-step random access at the time of the retrial. In this case, terminal 100 may perform timing adjustment for transmission of the PUSCH signal based on TA, and does not need to perform timing adjustment for the Type1 PRAM transmission.

In this case, base station 200 can receive the Preamble signal of Type1_PRACH even while failing to receive the PUSCH signal due to a deviation in timing synchronization. When the Preamble signal of Type1_PRACH is received, the random access procedure can be switched to the 4-step random access at the step of transmission of MSG2 (response to the PRACH), and can thus be continued and completed.

In addition, when the cause of the failure of PRACH transmission and PUSCH transmission is not a timing deviation (e.g., when the cause is a temporary decrease in reception power, etc.), the PUSCH may be correctly received at the time of the retrial, and it is thus possible to reduce latency in the random access procedure.

Embodiment 3

Above Embodiment 2 has been described in relation to the example in which the terminal uses the resource configurations of the PRACH depending on the situation. In Embodiment 3, a base station indicates, to a terminal, resources used for PRACH transmission depending on a situation. For example, the base station notifies the terminal of information (use PRACH resource information) on whether the random access using Type1_PRACH resources is performed without timing adjustment based on TA or the random access is performed using timing adjustment based on TA and Type2_PRACH resources. The terminal performs PRACH transmission in accordance with the notification. For the notification from the base station to the terminal, for example, higher layer signaling such as RRC signaling may be used, or lower layer signaling such as DCI may be used.

Note that, the configuration of the terminal according to Embodiment 3 is the same as that of terminal 100 according to Embodiment 1, but operations are partly different between Embodiments 3 and 1. Note also that, the configuration of the base station according to Embodiment 3 is the same as that of base station 200 according to Embodiment 1, but operations are partly different between Embodiments 3 and 1. Different operations between the configurations will be described later. Embodiment 3 will be described using the same reference numerals as those in Embodiment 1.

Hereinafter, an example will be described in which base station 200 indicates, to terminal 100, resources used for PRACH transmission depending on the situation of handover of terminal 100. Note that, in the handover of terminal 100, the case where a cell to which the terminal is handed over and a cell from which the terminal is handed over are formed by the same satellite is described as "intra-satellite handover." In addition, in the handover of terminal 100, the case where the cell to which the terminal is handed over and the cell from which the terminal is handed over are formed by respective different satellites is described as "inter-satellite handover."

For example, when terminal 100 performs a handover, terminal 100 cannot determine whether the handover is the intra-satellite handover or the inter-satellite handover.

When the handover of terminal 100 is the inter-satellite handover, base station 200 from which the terminal is handed over indicates to terminal 100 that the random access procedure is performed using the Type1_PRACH resources without performing timing adjustment based on TA. In the inter-satellite handover, propagation delays are different between the satellites. However, by using the Type1_PRACH resources, a Preamble signal of the PRACH can be detected by the satellite to which the terminal is handed over.

On the other hand, when the handover of terminal 100 is the intra-satellite handover, base station 200 indicates to terminal 100 that the random access procedure is performed using timing adjustment based on TA and Type2_PRACH resources. As compared to the differences in propagation delay between different satellites, the differences in propagation delay within the same satellite are small. Thus, the PRACH can be received at a correct timing by the satellite to which the terminal is handed over (i.e., the same satellite as the satellite from which the terminal is handed over). In addition, it is possible to reduce the usage amount of PRACH resources by using Type2_PRACH.

Further, as another example, base station 200 generates and notifies a TA command for each terminal 100 in order to align reception timings of signals from terminals 100 within the cell. Base station 200 is capable of estimating a transmission timing of terminal 100 based on PUSCH reception, and correcting the transmission timing using the TA command. However, it is difficult to estimate the timing when a timing deviation greater than or equal to a predetermined time period is caused and/or when the reception power is too low. Base station 200 indicates, to terminal 100 for which it is difficult to estimate the transmission timing, that the random access procedure is performed using Type1_PRACH resources without timing adjustment based on TA. Base station 200 detects the Type1_PRACH and can perform timing correction based on the TA command again.

[Configuration of Terminal]

The configuration of terminal 100 according to Embodiment 3 will be described with reference to FIG. 4 illustrating the configuration of terminal 100 according to Embodiment 1. The configuration of terminal 100 according to, to Embodiment 3 is the same as that of Embodiment 1, but the below-described processing is added.

Radio receiver 106 and demodulator/'decoder 107 receive, demodulate, and decode the use PRACH resource information transmitted by the base station.

PRACH generator 101 generates a Preamble signal of Type1_PRACH or a Preamble signal of Type2_PRACH based on the received use PRACH resource information.

When the use PRACH resource information is an indication of using the Type1_PRACH resources, the Preamble signal of Type1_PRACH is transmitted via radio transmitter 104 and antenna 105. In this instance, timing adjuster 103 adjusts the transmission timing of the Preamble signal of Type1_PRACH without based on TA (specific TA) (e.g., based on common TA). Note that, in the transmission of the Preamble signal of Type1_PRACH, the transmission timing does not have to be adjusted by timing adjuster 103.

When the use PRACH resource information is an indication of using the Type2_PRACH resources, the Preamble signal of Type2_PRACH is transmitted via radio transmitter 104 and antenna 105. In this instance, timing adjuster 103 adjusts the transmission timing of the Preamble signal of Type2_PRACH based on TA (specific TA).

[Configuration of Base Station]

The configuration of base station 200 according to Embodiment 3 will be described with reference to FIG. 5 illustrating the configuration of base station 200 according to Embodiment 1. The configuration of base station 200 according to Embodiment 3 is the same as that of Embodiment 1, but the below-described processing is added.

PRACH resource configurator 205 generates use PRACH resource information for each terminal 100 depending on the situation (e.g., depending on whether the handover of the terminal is the intra-satellite handover or the inter-satellite handover).

Data generator 206 generates transmission data including the use PRACH resource information. The data signal including the generated transmission data is subjected to transmission processing such as encoding and modulation in data transmission processor 207. The data signal is transmitted via radio transmitter 208 and antennas 201. Note that, the use PRACH resource information may be included in the DCI or may be included in the RRC message or MAC message.

Note that, although the example has been described in which the use PRACH resource information is information indicating PRACH resources (Type1 or Type2), the present disclosure is not limited to this example. The use PRACH resource information may be, for example, information indicating "with TA (with timing adjustment based on TA)" Or "without TA (without timing adjustment based on TA)."

Further, terminal 100 with TA may be configured to use the Type2_PRACH resources in a default operation. When receiving an indication of using the Type1_PRACH resources from base station 200, terminal 100 with TA may use the Type1_PRACH resources. It is made unnecessary for base station 200 to notify each of terminals 100 of the indication of the use PRACH resource each time when there are a large number of terminals 100 with TA. It is thus possible to reduce the overhead for notification.

The embodiments of the present disclosure have been described above.

Note that, in the above-described embodiments, the cell may be an area defined by the reception power of a Synchronization Signal/PBCH Block (SSB) or a Channel State Information-Reference Signal (CSI-RS) transmitted by the base station (satellite), or may be an area defined by the geographical position.

In the RRC signaling, the configuration of PRACH resources transmitted by the base station is notified by a parameter set such as RACH-ConfigCommon, RACH-ConfigDedicated, and RACH-ConfigGeneric.

Notifications of Type1_PRACH and Type2_PRACH resource configurations in the present disclosure may be notified as respective different parameter sets, or two types of resource configurations may be notified in a single parameter set.

The notifications of the resource configuration information of Type1_PRACH and Type2_PRACH transmitted by the base station may be broadcasted over the entire cell as the system information, or the notifications specific to each terminal may be notified. Further, the system information including the resource configuration information of Type1_PRACH but not including the resource configuration information of Type2_PRACH may be broadcasted over the entire cell. In this case, the terminal may perform the initial access by Type1_PRACH transmission based on the information, and then, the resource configuration information of Type2_PRACH specific to each terminal may be notified. The terminal may use Type2_PRACH transmission in random access after the resource configuration information of Type2_PRACH is notified.

When the system information including the resource configuration information of Type1_PRACH and Type2_PRACH is broadcasted over the entire cell, the system information is periodically transmitted. Accordingly, the overhead increases. On the other hand, when the notification of the system information including the resource configuration information of Type1_PRACH but not including the resource configuration information of Type2_PRACH is broadcasted over the entire cell, it is possible to reduce the amount of information so as to reduce the overhead.

Further, the above-described embodiments have been described in relation to the example in which the CP length and/or the OP length of the Type1_PRACH configuration are longer than those of the Type2_PRACH configuration. Although preferred for satellite communications, a CP length and/or a GP length of the Type1_PRACH configuration greater than those of the Type2_PRACH configuration are not necessarily required. Type1_PRACH may be defined as a PRACH resource to be transmitted without TA, and Type2_PRACH may be defined as a PRACH resource to be transmitted with TA. The expression "transmitting without TA" may correspond to transmitting without timing adjustment based on TA. The expression "transmitting with TA" may correspond to transmitting while performing, timing adjustment based on TA.

The terminal without TA may use the Type1_PRACH resource configuration and does not have to use the Type2_PRACH resource configuration. The terminal with TA may choose to use either the Type1_PRACH resource configuration or the Type2_PRACH resource configuration. When the Type1_PRACH resource-configuration is selected, the terminal may perform transmission without TA.

The terminal having a valid TA value or the terminal "with TA" does not necessarily have to be a terminal regularly receiving a TA command from a base station, but may be a terminal having a TA value obtained by another method such as using the positional information of the terminal, the orbital information (ephemeris) and/or positional information of the satellite by GPS, GNSS, and/or the like. Further, while the orbital information and/or the positional information of the satellite need to be updated over time, a terminal that holds valid orbital information and/or position information of the satellite may perform the same operation as that of the terminal "with TA" illustrated as the terminal "with TA" in Embodiments 1 to 3. In addition, a terminal that does not hold valid orbital information and/or positional information of the satellite due to expiration or the like may perform the same operation as the terminal "without TA" illustrated as the terminal "without TA" in Embodiments 1 to 3.

Further, the embodiments described above have been described in relation to the MACH resource configuration operations different between the terminal having a valid TA value or the terminal "with TA" and the terminal not having any valid TA value or the terminal "without TA," but the present disclosure is not limited thereto. For example, for the same terminal, the terminal in the state of having a valid TA value may be referred to as the terminal "with TA," and the terminal in the state of not having any valid TA may be referred to as the terminal "without TA," In this case, the terminal "with TA" may perform the same operation as the terminal "with TA" described in Embodiments 1 to 3 and the terminal "without TA" may perform the same operation as the terminal "without TA" described in Embodiments 1 to 3. In addition, the terminal with TA and the terminal without TA different from each other may perform respective different PRACH resource configuration operations. In the latter instance, PRACH resources to be used may be changed depending on the type of the terminal. The type of the terminal may be notified by Subscriber Profile ID (SPID) described in TS38.300V15.8.0.

As additional examples of the Type1_PRACH resources, a PRACH format without CP, PRACH format defined for NTN, or PRACH format with wide subcarrier spacing may be used. As additional examples of the Type2_PRACH resources, a PRACH format with CP, PRACH format used in Rel. 15 NR, and/or PRACH format with narrow subcarrier spacing may be used.

In the case of Contention Based Random Access (CBRA) in which the terminal randomly selects MACH resources within the range of resources indicated by the base station, the Type1 PRACH resources may be used since it is likely that timing is not in synchronization. In the case of Contention Free Random Access (CFRA) in which resources to be used are designated by the base station, the Type2 PRACH resources may be used since it is likely that timing is maintained in synchronization.

Note that the embodiments described above have been described by taking the NTN environment (e.g., a satellite communication environment) as an example, but the present disclosure is not limited thereto. The present disclosure may be applied to other communication environments (e.g., a terrestrial cellular environment in LTE and/or NR)

The expression "section" used in the above-described embodiments may be replaced with another expression such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A transmission apparatus according to an exemplary embodiment of the present disclosure includes: transmission circuitry, which, in operation, transmits a signal of a random access channel; and control circuitry, which, in operation, controls a resource configuration relevant to transmission of the signal in the random access channel based on a validity properly of information on adjustment of a transmission timing.

In the transmission apparatus according to an exemplary embodiment of the present disclosure, the control circuitry uses a first resource configuration in the random access channel when the information on the adjustment of the transmission timing is invalid, or uses a second resource configuration in the random access channel when the information on the adjustment of the transmission timing is valid.

In the transmission apparatus according to an exemplary embodiment of the present disclosure, in the first resource configuration, at least one of a length of a cyclic prefix, a length of a guard period, and a length of a preamble sequence of the signal of the random access channel is longer than that in the second resource configuration.

In the transmission apparatus according to an exemplary embodiment of the present disclosure, when the length of the preamble sequence in the first resource configuration is longer than that in the second resource configuration, a length of a code sequence used for the preamble sequence in the first resource configuration is longer than that in the second resource configuration, and/or a number of repetitions of the code sequence of the preamble sequence in the first resource configuration is greater than that in the second resource configuration.

In the transmission apparatus according to an exemplary embodiment of the present disclosure, a transmission occasion for the signal in the first resource configuration differs from a transmission occasion for the signal in the second resource configuration in at least one of time and frequency.

In the transmission apparatus according to an exemplary embodiment of the present disclosure, a transmission occasion for the signal in the first resource configuration is less frequent than a transmission occasion for the signal in the second resource configuration.

In the transmission apparatus according to an exemplary embodiment of the present disclosure, a number of code sequences usable for the first resource configuration is smaller than a number of code sequences usable for the second resource configuration.

In the transmission apparatus according to an exemplary embodiment of the present disclosure, the control circuitry controls transmission of the signal in the first resource configuration when a response to the signal having been transmitted in the second resource configuration is not received.

In the transmission apparatus according to an exemplary embodiment of the present disclosure, the control circuitry controls a first random access procedure when the information on the adjustment of the transmission timing is valid, or controls a second random access procedure when the information on the adjustment of the transmission timing is invalid, the second random access procedure having a larger number of steps than the first random access procedure.

In the transmission apparatus according to an exemplary embodiment of the present disclosure, the control circuitry applies the first resource configuration to the signal of the random access channel that is to be transmitted in the first random access procedure.

A reception apparatus according to an embodiment of the present disclosure includes: reception circuitry, which, in operation, receives a signal of a random access channel: and control circuitry, which, in operation, controls reception of the signal based on a resource configuration relevant to transmission of the signal in the random access channel, the resource configuration being associated with a validity property of information on adjustment of a transmission timing.

The reception apparatus according to an exemplary embodiment of the present disclosure further including: transmission circuitry, which, in operation, transmits information indicating whether to use a first resource configuration associated with invalidity of the information on the adjustment of the transmission timing or to use a second resource configuration associated with validity of the information on the adjustment of the transmission timing.

A transmission method according to an exemplary embodiment of the present disclosure includes: controlling a resource configuration relevant to transmission of a signal in a random access channel based on a validity property of information on adjustment of a transmission timing; and transmitting the signal of the random access channel.

A reception method according to an exemplary embodiment of the present disclosure includes: controlling reception of a signal based on a resource configuration relevant to transmission of the signal in a random access channel, the resource configuration being associated with a validity property of information on adjustment of a transmission timing; and receiving the signal of the random access channel.

The disclosure of Japanese Patent Application No. 2019-064589 dated Mar. 28, 2019 including the specification, drawings and abstract is incorporated herein by reference in its entirety.

INDUSTRIAL APPLICABILITY

An exemplary embodiment of the present disclosure is useful for radio communication systems.

REFERENCE SIGNS LIST

100 Terminal
101 PRACH generator
102, 206 Data generator
103 Timing adjuster
104, 208 Radio transmitter
105, 201 Antenna
106, 202 Radio receiver
107 Demodulator/decoder
108, 209 Controller
200 Base station
203 Data reception processor
204 PRACH detector
205 PRACH resource configurator
207 Data transmission processor

The invention claimed is:

1. A transmission apparatus, comprising:
   transmission circuitry, which, in operation, transmits a signal of a random access channel; and
   control circuitry, which, in operation, controls a resource configuration relevant to transmission of the signal in the random access channel based on a validity property of information on adjustment of a transmission timing, wherein
   the control circuitry, in operation, supports first and second random access procedures,
   when the information on the adjustment of the transmission timing is invalid, the control circuitry uses a first resource configuration in the random access channel or uses a second resource configuration in the random access channel, and
   when the information on the adjustment of the transmission timing is valid, the control circuitry controls the first random access procedure or the second random access procedure, the second random access procedure having a larger number of steps than the first random access procedure.

2. The transmission apparatus according to claim 1, wherein,
   in the first resource configuration, at least one of a length of a cyclic prefix, a length of a guard period, or a length of a preamble sequence of the signal of the random access channel is longer than that in the second resource configuration.

3. The transmission apparatus according to claim 2, wherein,
   when the length of the preamble sequence in the first resource configuration is longer than that in the second resource configuration, a length of a code sequence used for the preamble sequence in the first resource configuration is longer than that in the second resource configuration, and/or a number of repetitions of the code sequence of the preamble sequence in the first resource configuration is greater than that in the second resource configuration.

4. The transmission apparatus according to claim 1, wherein
   a transmission occasion for the signal in the first resource configuration differs from a transmission occasion for the signal in the second resource configuration in at least one of time and frequency.

5. The transmission apparatus according to claim 1, wherein
   a transmission occasion for the signal in the first resource configuration is less frequent than a transmission occasion for the signal in the second resource configuration.

6. The transmission apparatus according to claim 1, wherein
   a number of code sequences usable for the first resource configuration is smaller than a number of code sequences usable for the second resource configuration.

7. The transmission apparatus according to claim 1, wherein
   the control circuitry controls transmission of the signal in the first resource configuration when a response to the signal having been transmitted in the second resource configuration is not received.

8. The transmission apparatus according to claim 1, wherein
   the control circuitry applies the first resource configuration to the signal of the random access channel that is to be transmitted in the first random access procedure.

9. A reception apparatus, comprising:
   reception circuitry, which, in operation, receives a signal of a random access channel; and
   control circuitry, which, in operation, controls reception of the signal based on a resource configuration relevant to transmission of the signal in the random access channel, the resource configuration being associated with a validity property of information on adjustment of a transmission timing, wherein
   the control circuitry, in operation, supports first and second random access procedures,
   when the information on the adjustment of the transmission timing is invalid, the control circuitry uses a first resource configuration in the random access channel or a second resource configuration in the random access channel, and
   when the information on the adjustment of the transmission timing is valid, the control circuitry controls the first random access procedure or the second random access procedure, the second random access procedure having a larger number of steps than the first random access procedure.

10. The reception apparatus according to claim 9, comprising:
transmission circuitry, which, in operation, transmits information indicating whether to use a first resource configuration associated with invalidity of the information on the adjustment of the transmission timing or to use a second resource configuration associated with validity of the information on the adjustment of the transmission timing.

11. A transmission method, comprising:
controlling a resource configuration relevant to transmission of a signal in a random access channel based on a validity property of information on adjustment of a transmission timing; and
transmitting the signal of the random access channel, wherein
when the information on the adjustment of the transmission timing is invalid, the controlling uses a first resource configuration in the random access channel or a second resource configuration in the random access channel, and
when the information on the adjustment of the transmission timing is valid, the controlling includes selecting between a first random access procedure or a second random access procedure, the second random access procedure having a larger number of steps than the first random access procedure.

12. A reception method, comprising:
controlling reception of a signal based on a resource configuration relevant to transmission of the signal in a random access channel, the resource configuration being associated with a validity property of information on adjustment of a transmission timing; and
receiving the signal of the random access channel, wherein
when the information on the adjustment of the transmission timing is invalid, the controlling uses a first resource configuration in the random access channel or a second resource configuration in the random access channel, and
when the information on the adjustment of the transmission timing is valid, the controlling includes selecting between a first random access procedure or a second random access procedure, the second random access procedure having a larger number of steps than the first random access procedure.

\* \* \* \* \*